(12) United States Patent
Johnson et al.

(10) Patent No.: US 7,481,261 B2
(45) Date of Patent: Jan. 27, 2009

(54) FAN DISABLING DEVICE

(76) Inventors: Keith E. Johnson, 5700 Frank Reeder Rd., Pensacola, FL (US) 32526; Duane M. Johnson, 5700 Frank Reeder Rd., Pensacola, FL (US) 32526

(*) Notice: Subject to any disclaimer, the term of this patent is extended or adjusted under 35 U.S.C. 154(b) by 706 days.

(21) Appl. No.: 11/097,420

(22) Filed: Apr. 1, 2005

(65) Prior Publication Data
US 2006/0219382 A1 Oct. 5, 2006

(51) Int. Cl.
*F24F 11/04* (2006.01)
(52) U.S. Cl. ............... 165/11.1; 165/244; 340/584; 454/343
(58) Field of Classification Search ............... 165/11.1, 165/11.2, 244, 267, 287, 120, 121, 122; 62/126; 236/49.3; 415/119; 340/544, 584, 588, 628; 454/256, 342, 343
See application file for complete search history.

(56) References Cited

U.S. PATENT DOCUMENTS

| | | | | |
|---|---|---|---|---|
| 3,628,346 A | * | 12/1971 | Lagrone, Jr. | 62/126 |
| 3,749,992 A | * | 7/1973 | Jones | 318/452 |
| 3,990,069 A | * | 11/1976 | Schuman | 340/544 |
| 4,478,048 A | * | 10/1984 | Dills | 236/49.3 |
| 4,977,818 A | * | 12/1990 | Taylor et al. | 454/342 |
| 5,239,980 A | | 8/1993 | Hilt et al. | |
| 5,477,913 A | | 12/1995 | Polk et al. | |
| 5,540,273 A | | 7/1996 | Polk et al. | |
| 5,684,463 A | * | 11/1997 | Diercks et al. | 340/584 |
| 5,838,776 A | | 11/1998 | Adkins, II et al. | |
| 5,924,924 A | * | 7/1999 | Richardson | 454/256 |
| 5,945,924 A | | 8/1999 | Marman et al. | |
| 6,045,352 A | | 4/2000 | Nicholson | |
| 6,143,020 A | * | 11/2000 | Shigezawa et al. | 607/96 |
| 6,474,086 B1 | | 11/2002 | Liu | |
| 6,743,091 B2 | * | 6/2004 | Meneely, Jr. | 454/343 |
| 7,037,068 B2 | * | 5/2006 | Cobb et al. | 415/119 |
| 7,102,529 B2 | * | 9/2006 | Whitney | 340/628 |
| 7,130,720 B2 | * | 10/2006 | Fisher | 236/49.3 |
| 7,131,490 B1 | * | 11/2006 | Roskewich | 165/267 |
| 7,250,870 B1 | * | 7/2007 | Viner et al. | 340/588 |

\* cited by examiner

*Primary Examiner*—Ljiljana (Lil) V Ciric
(74) *Attorney, Agent, or Firm*—J. Wiley Horton

(57) ABSTRACT

A control system for disabling the fan of a heating, ventilating, and air-conditioning system upon the detection of an audible alarm, such as a smoke alarm. The preferred embodiment utilizes a tunable band pass filter/decibel level detector in conjunction with a microphone to detect an audible alarm. When an alarm is detected, the fan is disabled whether the HVAC is operating in heating, cooling, or manual fan "on" mode.

6 Claims, 3 Drawing Sheets

FAN DISABLING DEVICE

CROSS-REFERENCES TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates generally to a controller for a fan, such as a fan used in a heating, ventilating, and air conditioning ("HVAC") system. More specifically, the invention comprises a control system for shutting down the fan of a HVAC system upon detection of an audible alarm, such as a smoke alarm or an alarm from a carbon monoxide detector.

2. Description of the Related Art

HVAC systems pose significant concerns for the safety of the occupants of a house in the case of a fire. The operation of the fan of the HVAC system during a fire produces at least two undesirable consequences. First, the fan circulates smoke to regions of the house which are not directly affected by the fire. This can decrease the response time that the occupants have to evacuate safely from the house. Second, the fan can increase the supply of oxygen to the fire, thereby causing the fire to spread more rapidly. Even worse, the heat generated by a fire can cause the fan of an HVAC system to operate at maximum flow when operating the cooling mode, creating a devastating positive feedback situation.

Several control systems have been made to address these concerns, but the success of these systems has been limited because the systems are overly complicated and/or impractical to implement. One example is U.S. Pat. No. 5,477,913 to Polk. Polk describes a system for disabling a heating/cooling unit when the presence of gases at undesirable levels is detected, or when a smoke alarm has sounded. To accomplish this end, the system utilizes numerous logic circuit elements to disable the heating/cooling operation.

BRIEF SUMMARY OF THE INVENTION

The present invention comprises a control system for disabling the fan of a heating, ventilating, and air-conditioning system upon the detection of an audible alarm, such as a smoke alarm. The preferred embodiment utilizes a tunable band pass filter/decibel level detector in conjunction with a microphone to detect an audible alarm. When an alarm is detected, the fan is disabled whether the HVAC is operating in heating, cooling, or manual fan "on" mode.

REFERENCE NUMERALS IN THE DRAWINGS

| 10 | fan disabling device | 12 | thermostat |
|---|---|---|---|
| 14 | operating mode switch | 16 | fan switch |
| 18 | air-conditioning control line | 20 | heating control line |
| 22 | fan control line | 24 | alarm detection module |
| 26 | microphone | 28 | alarm light |
| 30 | reset switch | 32 | bandpass filter |
| 34 | relay | 36 | relay coil |
| 38 | relay switch | 40 | heating unit |
| 42 | air-conditioning unit | 44 | fan |
| 46 | decibel level detector | 48 | voltage source |
| 50 | switch | 52 | switch |

DETAILED DESCRIPTION OF THE INVENTION

Figure 1:
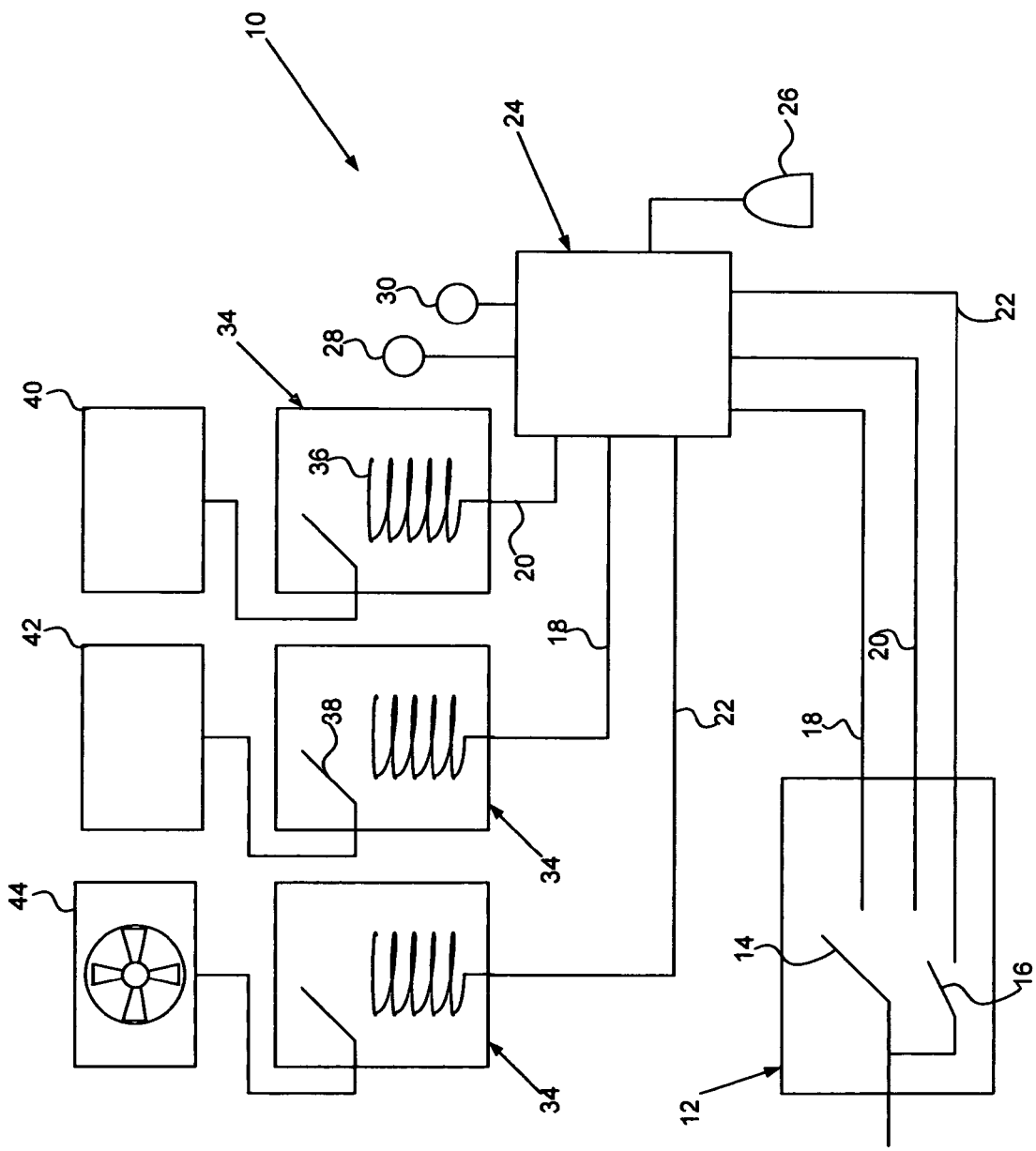
FIG. 1 is a schematic showing the present invention.

A schematic of the present invention, fan disabling device 10, is shown in FIG. 1. Thermostat 12 is provided for control of a heating, ventilating, and air-conditioning ("HVAC") system. The HVAC system generally includes fan 44, air-conditioning unit 42, and heating unit 40 (in some instances there will be one single unit). The thermostat for the HVAC system illustrated in FIG. 1 allows the user to select heating mode, air-conditioning mode or ventilation mode. The air conditioning mode and heating mode are mutually exclusive in that both heating unit 40 and air-conditioning unit 42 do not operate concurrently. Those that are skilled in the art know that operation of air-conditioning unit 42 and heating unit 40 also involves use of the fan. The ventilation mode, however, operates independently from air-conditioning mode and heating mode in that the user can select to operate fan 44 of HVAC system even when air-conditioning unit 42 and heating unit 40 are not operating.

Thermostat 12 includes conventional features such as operating mode switch 14 and fan switch 16. Thermostat 12 also includes numerous other features which are not illustrated. Operating mode switch 14 closes the circuit and supplies voltage to air-conditioning control line 18 or heating control line 20 depending on the operating mode selected by the user. When the user selects air-conditioning mode, thermostat 12 provides voltage via operating mode switch 14 to air-conditioning control line 18 when the ambient temperature of thermostat 12 is greater than the level set by the user. When the user selects heating mode, thermostat 12 provides voltage via operating mode switch 14 to heating control line 20 when the ambient temperature of thermostat 12 is lower than the level set by the user. Fan switch 16 allows the user to select ventilation mode (i.e., the user can select to have the fan "on" whether voltage is supplied to air-conditioning control line 18, heating control line 20 or neither).

Alarm detection module 24 is provided to detect the presence of an audible alarm. Most houses today are equipped with audible alarms that notify the occupants when hazardous conditions exists. Examples of audible alarms include smoke detectors and carbon monoxide detectors. These alarms emit loud, high frequency sounds when the presence of smoke or carbon monoxide is detected. As illustrated in FIG. 1, alarm detection module 24 has microphone 26. Microphone 26 serves to convert sound waves into an electrical signal. Alarm detection module 24 includes a bandpass filter and a decibel level detector to filter the electrical signal to identify when an audible alarm has sounded. These components of the alarm detection module will be described in more detail subsequently. Alarm detection module also has an alarm light which provides a visual indication to the user that alarm detection module 24 has detected an audible alarm and has disabled the fan. Reset switch 30 is provided to allow the user to re-enable the fan and HVAC system.

Those that are skilled in the art know that bandpass filters generally contain resonator combinations of inductance and capacitance which are mathematically designed to respond to design frequencies while rejecting all other "out-of-band" frequencies. Accordingly, the exact design of a bandpass filter is influenced by the desired frequency range that the designer wishes to "pass." The preferred embodiment of the present invention contains a tunable bandpass filter. By using a tunable bandpass filter, the filter can be calibrated to a desired wavelength range. This feature is significant since all audible alarms do not emit sound at the same frequency. Alarm detection module 24 can therefore be calibrated to the exact make and model of audible alarm for which the alarm detection module is to detect.

Decibel level detectors measure the level of a signal. The level of the signal transmitted by microphone 26 corresponds to the level of the sound detected by microphone 26. Accordingly, high sound levels result in the transmission of high signal levels. Various types of decibel level detectors are known in the art. A decibel level detector generally converts an input signal into an output voltage. The decibel level detector used in the preferred embodiment of the present invention is configured to supply voltage to operate a switch when the input signal reflects that an audible alarm has been detected. Since most audible alarms operate between 85 and 90 dB, it is desirable to configure the decibel level detector to operate the switch when sounds in this level are detected. It is desirable to design the set point for operating the switch slightly below this decibel range since the proximity of alarm detection module 24 and the audible alarm may vary.

Figure 2:
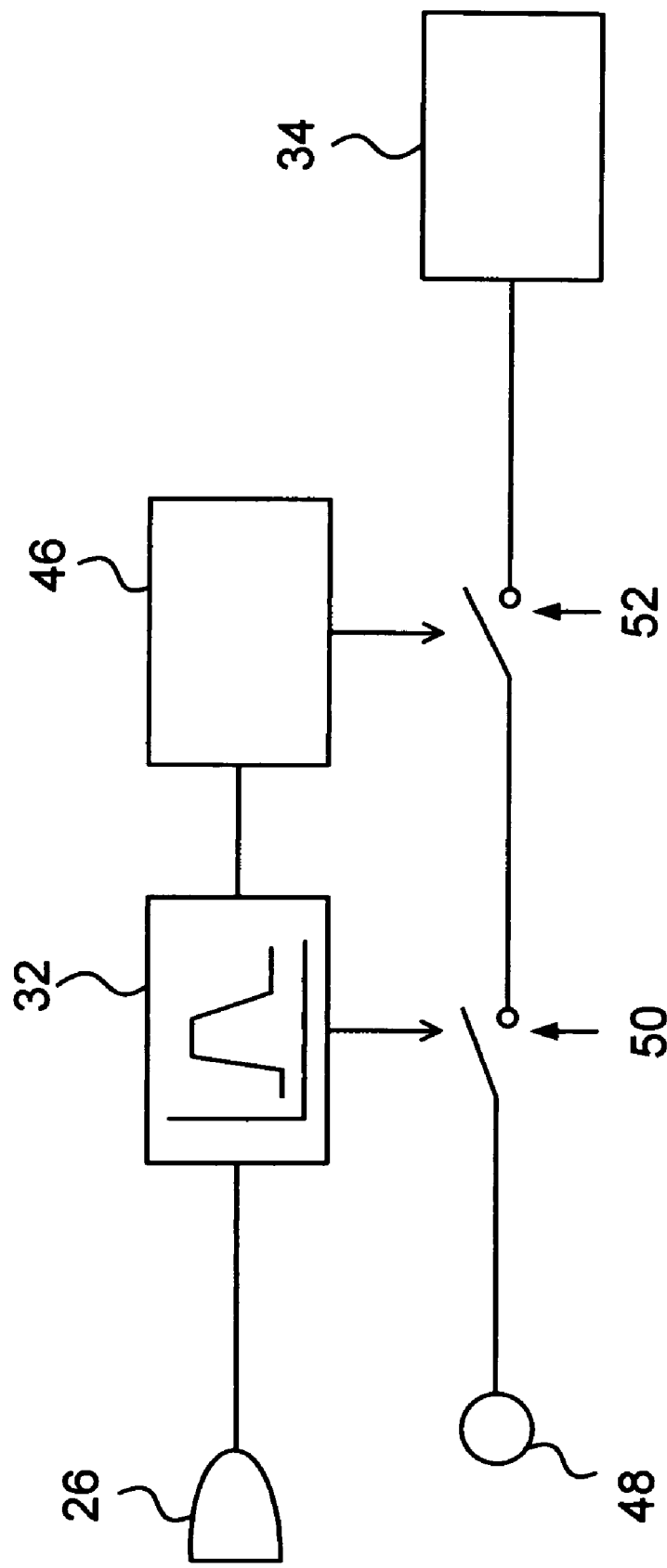
FIG. 2 is a schematic showing a configuration of an alarm detection module.
Figure 3:
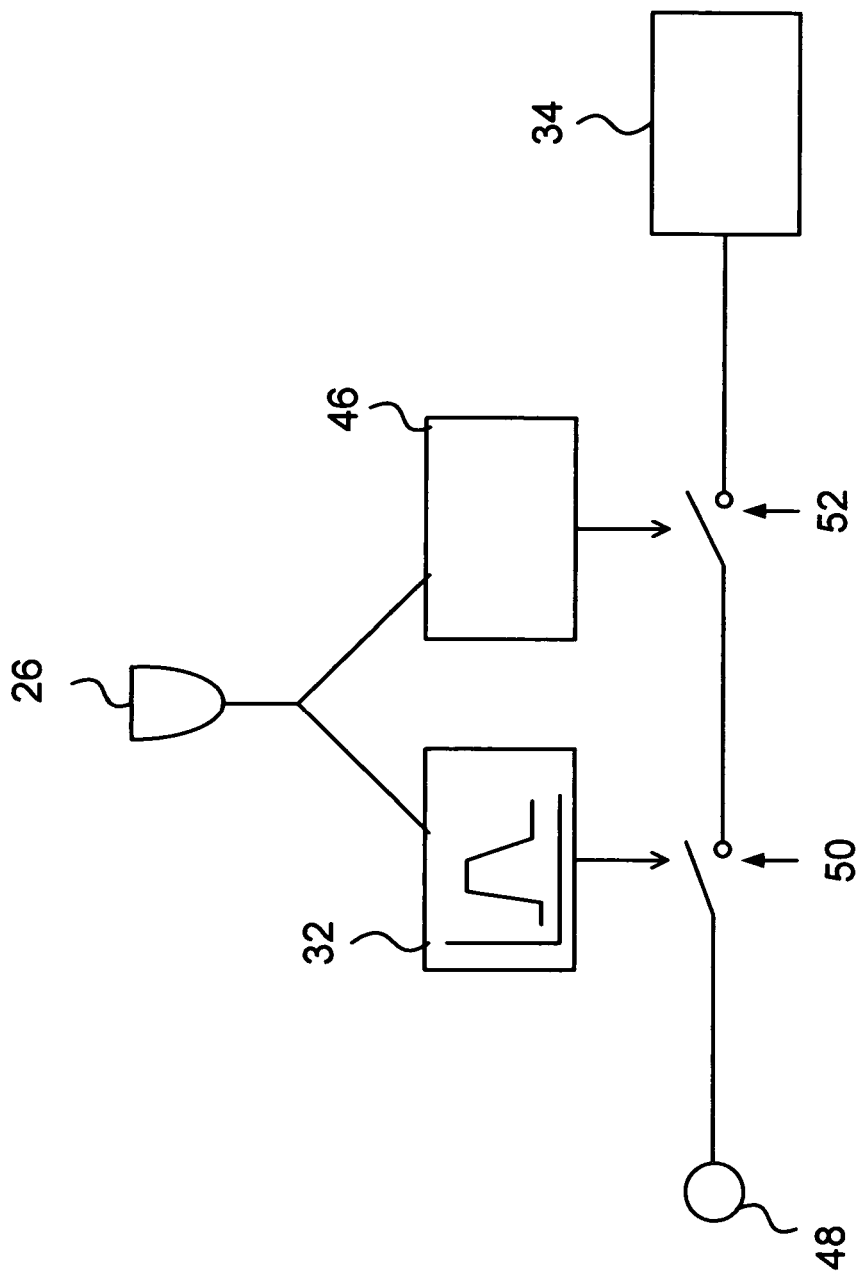
FIG. 3 is a schematic showing a configuration of an alarm detection module.

There are many arrangements of alarm detection module 24 that can be used, and these variations do not depart from the scope and spirit of the present invention. Examples of these variations are illustrated in FIGS. 2 and 3. FIG. 2 illustrates the use of bandpass filter 32 and decibel level detector 46 in series. A simple circuit connects relay 34 to voltage source 48. In this embodiment, no current is supplied to relay 34 because switch 50 and switch 52 are open in the default position. Microphone 26 transmits electrical signal to bandpass filter 32. If the signal is in the frequency range bandpass filter 32 is designed to pass, bandpass filter 32 operates to close switch 50 and transmits the electrical signal on to decibel level detector 46. If the electrical signal exceeds the design threshold for decibel level detector 46, decibel level detector 46 causes switch 52 to close. When switch 52 closes, current is supplied to relay 34, thereby disabling the fan. Obviously, bandpass filter 32 and decibel level detector 46 could be reversed in sequence so that the electrical signal was transmitted to decibel level detector 46 before being transmitted to bandpass filter 32. The reader will appreciate that both switch 52 and switch 50 must be triggered to disable the HVAC system. This feature cuts down on the false alarms since a "triggering" sound must have both the sound level and frequency characteristics of an audible alarm. As discussed above, the user can use reset switch 30 to re-enable the HVAC system. Reset switch 30 can accomplish this by reopening switch 50 and switch 52.

FIG. 3 illustrates bandpass filter 32 and decibel level detector 46 in parallel configuration. In this configuration microphone 26 sends an electrical signal to bandpass filter 32 and decibel level detector. If the signal is in the frequency range bandpass filter 32 is designed to pass, then bandpass filter 32 causes switch 50 to close. If the signal exceeds the design threshold of decibel level detector 46, then decibel level detector 46 causes switch 52 to close. Accordingly if a signal is transmitted with the characteristics for which alarm detection module 24 is designed to detect, both switch 50 and switch 52 will close and current will be transmitted from voltage source 48 to relay 34, thereby disabling the fan. As in the previously illustrated embodiment, both switch 50 and switch 52 must be triggered to disable the HVAC system.

Referring back to FIG. 1, relay 34 is an electrically actuated switch. Although relay 34 can be any sort of electrically actuated switch known in the art, in the preferred embodiment relay 34 is a "normally closed" relay. Relay 34 is principally composed of relay coil 36 and relay switch 38. Those that are skilled in the art know that relays operate on basic electromagnetic principles. When current is sent to relay coil 36 an electromagnetic field is created which causes relay switch 38 to open or close. The illustration of relay 34 in FIG. 1 is simplified. Those that are skilled in the art know that a relay actually incorporates two separate circuits. One circuit acts as a control line for operation of the switch, and a second circuit is opened or closed by activation of the switch. In the preferred embodiment, the circuit shown in FIGS. 2 and 3 is used to control the operation of the switch. The circuits represented in FIG. 1 as air conditioning control line 18, heating control line 20, and fan control line 22 are opened and closed by activation of the switch.

Having described the various components of the present invention, the reader will now appreciate how the invention operates to disable the fan of an HVAC system. Regardless of the operating mode selected by a user, the detection of an audible alarm by alarm detection module 24 will result in the opening of relays 34 to fan 44, air-conditioning unit 42, and heating unit 40. This effectively and completely disables the fan by cutting off the flow of current.

Although the preceding description contains significant detail, it should not be construed as limiting the scope of the invention but rather as providing illustrations of the preferred embodiments of the invention. As an example, many configurations of alarm detection module 24 can be used without departing from the spirit and scope of the present invention. Accordingly, the scope of the invention should be defined by ensuing patent claims and not the examples given.

Having herein described my invention, We claim:

1. A fan disabling device for disabling the fan of a heating, ventilating, and air-conditioning system when an audible alarm is sounded, wherein said system has a fan, an air-conditioning unit, a heating unit, and a thermostat including
  i. an air-conditioning control line;
  ii. a heating control line;
  iii. a fan control line;
  iv. an operating mode switch allowing a user to change the operating mode of said system between a heating mode and a cooling mode;
  v. a fan switch allowing said user to change control of the fan mode of said system between automatic mode and on mode; comprising:
  a. an alarm detection module including
  i. a microphone;
  ii. a bandpass filter, electronically connected with said microphone, wherein said bandpass filter is configured to pass a range of frequencies corresponding to the frequencies emitted by said audible alarm;
  iii. a decibel level detector, electronically connected with said microphone and said bandpass filter, wherein said decibel level detector is configured to identify signal levels corresponding to sound levels emitted by said audible alarm;

b. a first electrical switch, electronically connected to said alarm detection module, wherein said first electrical switch is configured to cause an open circuit in said fan control line when said audible alarm is detected by said alarm detection module;

c. a second electrical switch, electronically connected to said alarm detection module, wherein said second electrical switch is configured to cause an open circuit in said air-conditioning control line when said audible alarm is detected by said alarm detection module;

d. a third electrical switch, electronically connected to said alarm detection module, wherein said third electrical switch is configured to cause an open circuit in said heating control line when said audible alarm is detected by said alarm detection module.

2. The fan disabling device of claim 1, said alarm detection module further comprising a reset switch.

3. The fan disabling device of claim 2, wherein said bandpass filter and said decibel level detector are electrically connected in series.

4. The fan disabling device of claim 2, wherein said bandpass filter and said decibel level detector are electrically connected in a parallel configuration.

5. The fan disabling device of claim 1, wherein said bandpass filter and said decibel level detector are electrically connected in series.

6. The fan disabling device of claim 1, wherein said bandpass filter and said decibel level detector are electrically connected in a parallel configuration.

* * * * *